(12) United States Patent
Ramzan et al.

(10) Patent No.: US 7,315,941 B2
(45) Date of Patent: Jan. 1, 2008

(54) MULTI-CERTIFICATE REVOCATION USING ENCRYPTED PROOF DATA FOR PROVING CERTIFICATE'S VALIDITY OR INVALIDITY

(75) Inventors: Zulfikar Amin Ramzan, San Mateo, CA (US); Craig B. Gentry, Mountain View, CA (US); Bernhard Bruhn, Stuttgart (DE)

(73) Assignee: NTT DoCoMo Inc., Tokyo (JP)

( * ) Notice: Subject to any disclaimer, the term of this patent is extended or adjusted under 35 U.S.C. 154(b) by 0 days.

(21) Appl. No.: 11/304,201

(22) Filed: Dec. 14, 2005

(65) Prior Publication Data

US 2007/0074036 A1 Mar. 29, 2007

Related U.S. Application Data

(60) Provisional application No. 60/637,177, filed on Dec. 17, 2004.

(51) Int. Cl.
*H04L 9/00* (2006.01)
(52) U.S. Cl. ............... 713/156; 713/157; 713/158; 380/278
(58) Field of Classification Search .......... 713/156, 713/157, 158
See application file for complete search history.

(56) References Cited

U.S. PATENT DOCUMENTS 5,666,416 A 9/1997 Micali (Continued)

FOREIGN PATENT DOCUMENTS

WO WO2005/002944 3/2005

OTHER PUBLICATIONS

W. Aiello, S. Lodha, and R. Ostrovsky. Fast digital identity revocation. In *Proc. of CRYPTO '98*, 1998.

(Continued)

*Primary Examiner*—Gilberto Barron, Jr.
*Assistant Examiner*—Martin Jeriko P San Juan
(74) *Attorney, Agent, or Firm*—Michael Shenker; MacPherson Kwok Chen & Heid LLP (57) ABSTRACT

A certification authority (CA, 120) generates decryption key data ($K'_{Fj}$) for each set (F) in the complement cover (804) for a plurality of digital certificates. The CA encrypts all or a portion of the validity proof data ($c_j(i)$) for each digital certificate (140.*i*) for each time period j for which the validity proof is to be provided. For each certificate, the decryption can be performed with decryption keys ($K_{ij}$) that can be obtained from the decryption key data ($K'_{Fj}$) for any set containing the certificate. The CA distributes the encrypted portions of the validity proof data to prover systems that will provide validity proofs in the periods j. To perform certificate re-validation in a period j, the CA constructs the complement cover for the set of the revoked certificates, and distributes the decryption key data ($K'_{Fj}$) for the sets in the complement cover. In some embodiments, for each period j, the decryption keys ($K_{ij}$) are also a function of the decryption key data provided for the preceding periods of time. Therefore, to perform the re-validation, the CA constructs the complement cover not for the set of all the revoked certificates but only for the set of the certificates revoked in the previous period j−1. The complement cover size can therefore be reduced. Other features and embodiments are also provided.

47 Claims, 4 Drawing Sheets

U.S. PATENT DOCUMENTS

| | | | |
|---|---|---|---|
| 5,687,235 | A | 11/1997 | Perlman |
| 5,699,431 | A | 12/1997 | Van Oorschot |
| 5,717,757 | A | 2/1998 | Micali |
| 5,717,758 | A | 2/1998 | Micali |
| 5,793,868 | A | 8/1998 | Micali |
| 5,903,651 | A | 5/1999 | Kocher |
| 5,960,083 | A | 9/1999 | Micali |
| 6,044,462 | A | 3/2000 | Zubeldia |
| 6,097,811 | A | 8/2000 | Micali |
| 6,128,740 | A | 10/2000 | Curry |
| 6,141,347 | A * | 10/2000 | Shaughnessy et al. ...... 370/390 |
| 6,226,743 | B1 | 5/2001 | Naor et al. |
| 6,292,893 | B1 | 9/2001 | Micali |
| 6,301,659 | B1 | 10/2001 | Micali |
| 6,381,695 | B2 * | 4/2002 | Kudo et al. ................. 713/156 |
| 6,381,696 | B1 * | 4/2002 | Doyle ........................ 713/156 |
| 6,397,329 | B1 | 5/2002 | Aiello et al. |
| 6,442,689 | B1 | 8/2002 | Kocher |
| 6,487,658 | B1 | 11/2002 | Micali |
| 6,532,540 | B1 | 3/2003 | Kocher |
| 6,766,450 | B2 | 7/2004 | Micali |
| 7,043,024 | B1 | 5/2006 | Dinsmore et al. |
| 2002/0046337 | A1 | 4/2002 | Micali |
| 2002/0165824 | A1 | 11/2002 | Micali |
| 2003/0217265 | A1 | 11/2003 | Nakano et al. |
| 2003/0221101 | A1 | 11/2003 | Micali |
| 2003/0236976 | A1 | 12/2003 | Wheeler |
| 2004/0049675 | A1 | 3/2004 | Micali |
| 2004/0128504 | A1 | 7/2004 | Kivinen |
| 2005/0053045 | A1 | 3/2005 | Chmora |
| 2005/0055548 | A1 | 3/2005 | Micali |
| 2005/0081037 | A1 | 4/2005 | Kumagai |

OTHER PUBLICATIONS

G. Ateniese, J. Camenisch, M. Joye, and G. Tsudik. A Practical and Provably Secure Coalition-Resistant Group Signature Scheme. In *Proceedings of CRYPTO 2000*, 2000.

M. Bellare and P. Rogaway. Random oracles are practical: A paradigm for designing efficient protocols. In *Proc. First Annual Conference on Computer and Communications Security*, ACM, 1993.

D. Boneh, B. Lynn, and H. Shacham. Short signatures from the Weil pairing. In *Proceedings of Asiacrypt '01*, 2001.

F. Elwailly and Z. Ramzan. QuasiModo: More Efficient Hash Tree-Based Certificate Revocation. Manuscript, 2003.

I. Gassko, P. S. Gemmell, and P. MacKenzie. Efficient and fresh certification. In Proceedings of PKC 2000, 2000.

S. Goldwasser, S. Micali, and R. L. Rivest. A Digital Signature Scheme Secure Against Adaptive Chosen-Message Attacks. SIAM Journal on Computing, 17(2):281-308, 1988.

Y-C. Hu, A Perrig, and D. Johnson. Efficient security mechanisms for routing protocols. In proceedings of the 10th Annual Network and Distributed System Security Symposium (NDSS), 2003.

M. Jakobsson, J-P.Hubaux, and L. Buttyan. A micropayment scheme encouraging collaboration in multi-hop cellular networks. In *Proceedings of the 7th International Conference on Financial Cryptography*, 2003.

M. Jakobsson, T. Leighton, S. Micali, and M. Szydlo. Fractal merkle tree representation and traversal. In *Proceedings of the Cryptographer's Track*, RSA Conference, 2003.

S. Jarecki and A. Odlyzko. An efficient micropayment system based on probabilistic polling. In *Proceedings of the 1st International Conference on Financial Cryptography*, 1997.

Robert Johnson, David Molnar, Dawn Xiaodong Song, and David Wagner. Homomorphic signature schemes. In CT-RSA, pp. 244-262, 2002.

C. Jutla and M. Yung. PayTree: Amortized signatures for flexible micropayments. In *Proceedings of the second USENIX workshop on electronic commerce*, 1996.

S. Kim and H. Oh. An atomic micropayment system for a mobile computing environment. *IEICE Transactions of Information and Systems*, E84-D(6):709-716, 2001.

P. Kocher. On Certificate Revocation and Validation. In *Proceedings of the 2nd International Conference on Financial Cryptography*, 1998.

S. Micali. Efficient Certificate Revocation. MIT/LCS/TM 542b, Massachusetts Institute of Technology, 1996.

R. J. Lipton and R. Ostrovsky. Micro-Payments via Efficient Coin Flipping. In *Proceedings of the 2nd International Conference on Financial Cryptography*, 1998.

A. Malpani, R. Housely, and T. Freeman. Simple Certificate Validation Protocol—(SCVP). In *IETF Draft—draft-ietf-pkix-scvp-12. txt*, Jun. 2003.

S. Micali. Efficient Certificate Revocation. In *Proceedings of the RSA Data Security Conference*, 1997. Also U.S. Patent No. 5,666,416.

S. Micali. NOVOMODO: scalable certificate validation and simplified PKI management. In *Proceedings of the 1st Annual PKI Research Workshop*, 2002.

M. Myers, R. Ankney, A. Malpani, S. Galperin, and C. Adams. X.509 internet public key infrastructure Online Certificate Status Protocol—OCSP. In *Internet RFC 2560*, Jun. 1999.

M. Naor and K. Nissim. Certificate Revocation and Certificate Update. In *Proceedings of USENIX Security*, 1998.

National Bureau of Standards. NBS FIPS PUB 81: DES modes of operation. 1980.

National Institute of Standards. FIPS 180-1: Secure hash standard. 1995.

M. Pierce and D. O'Mahony. Micropayments for Mobile Networks. In *Proceedings of European Wireless*, 1999. Winner of Best Paper Award.

R.L. Rivest. The MD5 message digest algorithm. In *Internet RFC 1321*, Apr. 1992.

R.L. Rivest. Electronic Lottery Tickets as Micropayments. In *Proceedings of the 2nd International Conference on Financial Cryptography*, 1997.

R.L. Rivest and A. Shamir. PayWord and MicroMint—Two Simple Micropayment Schemes. *CryptoBytes (RSA Laboratories)*, 2(1), 1996. Proceedings of 1996 International Workshop on Security Protocols.

R.L. Rivest, A. Shamir, and L. Adleman. A Method for Obtaining Digital Signatures and Public-Key Cryptosystems. *Communications of the ACM*, 21:120-126, 1978.

Ron Steinfeld, Laurence Bull, and Yuliang Zheng. Content extraction signatures. In *Proceedings of the 4th International Conference Seoul on Information Security and Cryptology*, pp. 285-304. Springer-Verlag, 2002.

H. Tewari and D. O'Mahony. Multiparty Micropayments for Ad-Hoc Networks. In *Proceedings of the IEEE Wireless Communications and Networking Conference (WCNC)*, 2003.

H. Tewari and D. O'Mahony. Real-Time Payments for Mobile IP. *IEEE Communications*, 41(2):126-136, 2003.

D. Wheeler. Transactions Using Bets. In *Proceedings of Fourth Cambridge Workshop on Security Protocols*, 1996.

J. Zhou and K-Y, Lam. Undeniable Billing in Mobile Communication. In *Proceedings of MOBICOM*, 1998.

A. Savvides, W. L. Garber, R. L. Moses, and M.B. Srivastava. An Analysis of Error Including Parameters in Multihop Sensor Node Localization. IEEE Transactions on Mobile Computing, vol. 4, No. 6, Nov./Dec. 2005.

J. C. Jordan. Design and Implementation of a Stochastic Wireless Sensor Network. University of Illinois at Urbana-Champaign, 2003.

U.S. Appl. No. 11/218,093, filed on Aug. 31, 2005, entitled "Revocation Of Cryptographic Digital Certificates" Inventors: Craig B. Gentry et al.

\* cited by examiner

MULTI-CERTIFICATE REVOCATION USING ENCRYPTED PROOF DATA FOR PROVING CERTIFICATE'S VALIDITY OR INVALIDITY

CROSS REFERENCE TO RELATED APPLICATIONS

The present application claims priority of U.S. provisional patent application No. 60/637,177, filed Dec. 17, 2004, incorporated herein by reference.

BACKGROUND OF THE INVENTION

The present invention relates to public key cryptography, and more particularly to digital certificate revocation.

Figure 1:
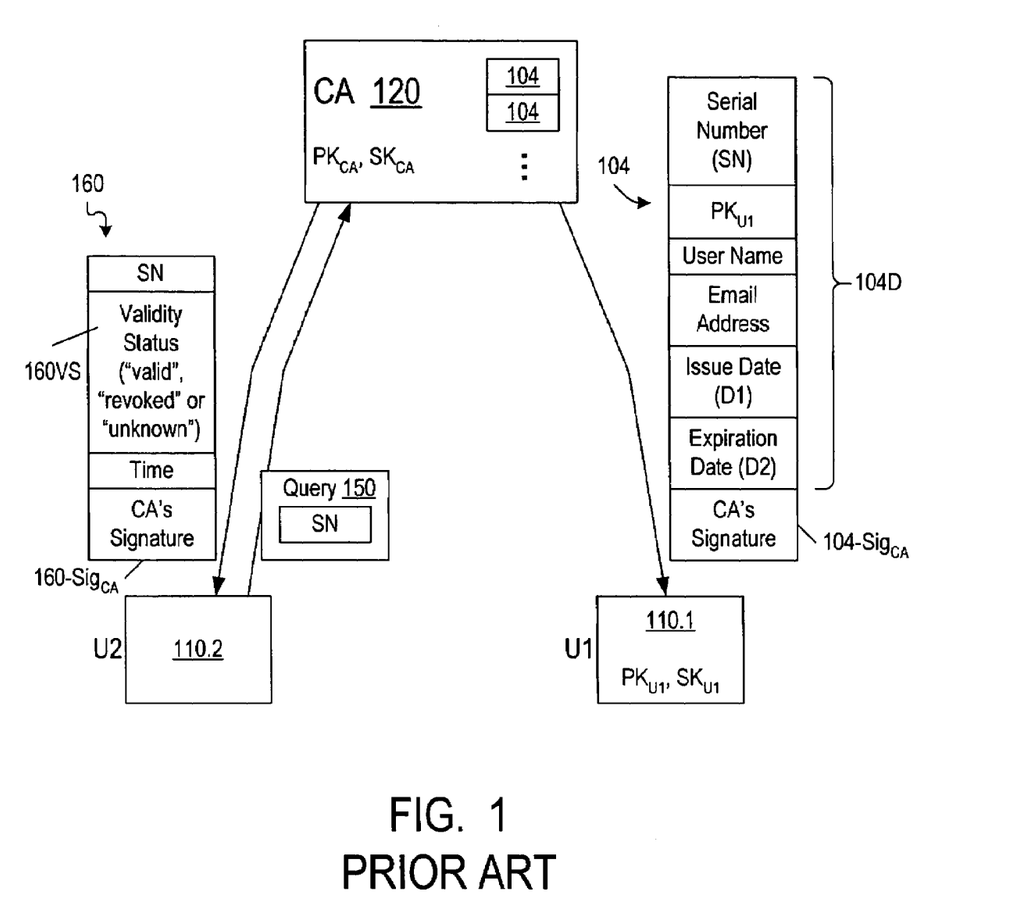
FIGS. 1, 2 are block diagrams illustrating prior art certificate revocation schemes.

Digital certificates 104 (FIG. 1) are used in public key infrastructures (PKI) to facilitate secure use and management of public keys in a networked computer environment. Users U1, U2, . . . utilize their computer systems 110.1, 110.2, . . . to generate respective key pairs (PK, SK) where PK is the public key and SK is the secret key. FIG. 1 shows a key pair ($PK_{U1}$, $SK_{U1}$) for user U1. The users register their public keys PK, over a network, with a certification authority (CA) 120. Alternatively, the key pairs can be generated by CA 120 and sent to the users. CA 120 is a secure, trusted computer system. For each public key PK, CA 120 generates a digital certificate 104. Certificate 104 contains the public key PK and the user's name and/or email address or addresses, may also contain the certificate's serial number SN (generated by the CA to simplify the certificate management), the certificate issue date D1, the expiration date D2, an identification of algorithms to be used with the public and secret keys, an identification of the CA 120, and possibly other data. The data mentioned above is shown at 104D. Certificate 104 also contains CA's signature 104-$Sig_{CA}$ on the data 104D. The signature is generated using CA's secret key $SK_{CA}$. CA 120 sends the certificate 104 to the user's (key owner's) computer system 110. Either the owner or the CA 120 can distribute the certificate to other parties to inform them of the user's public key PK. Such parties can verify the CA's signature 104-$Sig_{CA}$ with the CA's public key $PK_{CA}$ to ascertain that the certificate's public key PK does indeed belong to the person whose name and email address are provided in the certificate.

A certificate may have to be revoked prior to its expiration date D2. For example, the certificate owner U may change his affiliation or position, or the owner's private key $SK_U$ may be compromised. Other parties must be prevented from using the owner's public key if the certificate is revoked.

One approach to prevent the use of public keys of revoked certificates is through a certificate revocation list (CRL). A CRL is a signed and time-stamped list issued by CA 120 and specifying the revoked certificates by their serial numbers SN. These CRLs must be distributed periodically even if there are no new revoked certificates in order to prevent any type of replay attack. The CRL management may be unwieldy with respect to communication, search, and verification costs. Certificate revocation trees (CRTs) can be used instead of CRLs as described in [15] (the bracketed numbers indicate references listed at the end before the claims).

Instead of CRLs and CRTs, CA 120 could answer queries about specific certificates. In FIG. 1, user U2 issues a query 150 with the serial number SN of certificate 104 of user U1. CA 120 responds with a validity status information 160 containing the serial number SN, a validity status field 16OVS ("valid", "revoked" or "unknown"), and a time stamp "Time". The response is signed by CA (field 160-$Sig_{CA}$). This approach is used for Online Certificate Status Protocol (OCSP). See [23]. Disadvantageously, the CA's digital signature 160-$Sig_{CA}$ can be quite long (over 1024 bits with RSA), especially since the CA must be very secure. In addition, if CA 120 is centralized, the CA becomes a validation bottleneck. If CA 120 is decentralized (replicated), the security is weakened as the CA's signing key $SK_{CA}$ is replicated.

Figure 2:
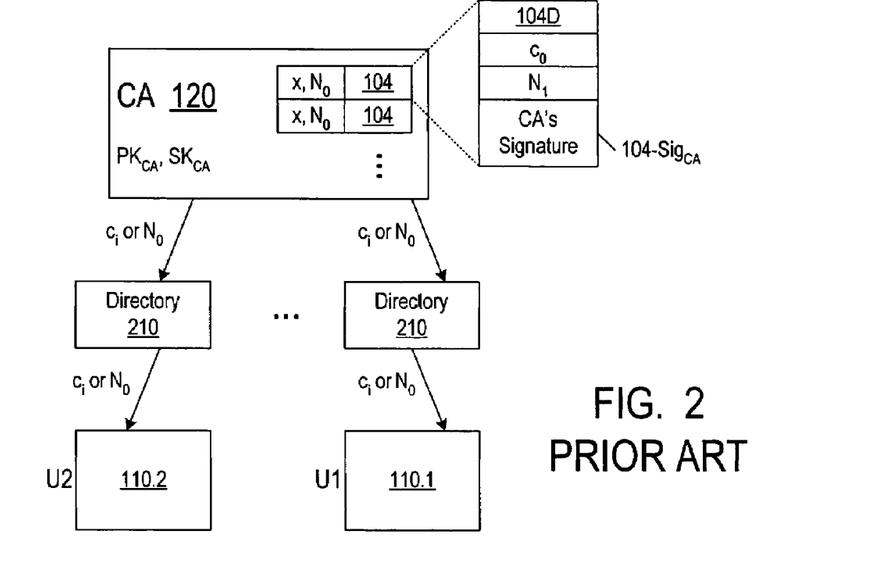

FIG. 2 illustrates a "NOVOMODO" approach, which allows CA 120 to provide an unsigned validity status through untrusted directories 210 at pre-specified time intervals (e.g. every day, or every hour, etc.). Directories 210 are computer systems that do not store secret information. The system works as follows.

Let f be a predefined public length-preserving function $$f: \{0,1\}^n \to \{0,1\}^n$$

where $\{0,1\}^n$ is the set of all binary strings of a length n. Let $f^i$ denote the f-fold composition; that is, $f^i(x)=x$ for $i=0$, and $f^i(x)=f(f^{i-1}(x))$ for $i>0$. Let f be one-way, i.e. given $f(x)$ where x is randomly chosen, it is hard (infeasible) to find a pre-image z such that $f(z)=f(x)$, except with negligible probability. "Infeasible" means that given a security parameter k (e.g. k=n), the pre-image z cannot be computed in a time equal to a predefined polynomial in k except with negligible probability. Let us assume moreover that f is one-way on its iterates, i.e. for any i, given $y=f^i(x)$, it is infeasible to find z such that $f(z)=y$.

Let f be a predefined public length-preserving function $$f: \{0,1\}^n \to \{0,1\}^n$$

where $\{0,1\}^n$ is the set of all binary strings of a length n. Let $f^i$ denote the i-fold composition; that is, $f^i(x)=x$ for $i=0$, and $f^i(x)=f(f^{i-1}(x))$ for $i>0$. Let f be one-way, i.e. given $f(x)$ where x is randomly chosen, it is hard (infeasible) to find a pre-image z such that $f(z)=f(x)$, except with negligible probability. "Infeasible" means that given a security parameter k (e.g. k=n), the pre-image z cannot be computed in a time equal to a predefined polynomial in k except with negligible probability. Let us assume moreover that f is one-way on its iterates, i.e. for any i, given $y=f^i(x)$, it is infeasible to find z such that $f(z)=y$.

We will sometimes denote x as x(SN) for a certificate with a serial number SN, and similarly $c_i=c_i(SN)$ where $i=0, 1, \ldots$. The value $c_0$ is called a "validation target". CA 120 inserts $c_0$ into the certificate 104 together with data 104D (FIG. 1). CA 120 also generates a random revocation seed number $N_0$, computes the "revocation target" $N_1=f(N_0)$, and inserts $N_1$, into certificate 104. CA 120 keeps all $c_i$; secret for $i>0$. The values x and $N_0$ are also secret. Clearly, all $c_i$ can all be computed from x, and the validation target $c_0$ can be computed from any $c_i$. CA 120 stores in its private storage the values x and $N_0$ for each certificate 104, and possibly (but not necessarily) caches the $c_i$ values.

Every day i ($i=1, 2, \ldots 365$), a certificate re-validation is performed for the valid certificates as follows. For each certificate 104, CA distributes to directories 210 a validation data structure which includes, in addition to a validity status indication (not shown in FIG. 2, can be "valid" or "revoked"):

1. the certificate's "i-token" $c_i$ if the certificate is valid on day i;
2. the revocation seed $N_0$ if the certificate has been revoked.

(We will call $c_i$ a "validity proof", and $N_0$ a "revocation proof".) This information is distributed unsigned. Each directory 210 provides this information, unsigned, to a requester system 110 in response to a validity status request 150 (FIG. 1). To verify, the requester (verifier) 110 performs the following operations:
1. If the validity status is "valid", the verifier 110 checks that $f^i(c_i)=c_0$.
2. If the validity status is "revoked", the verifier 110 checks that $f(N_0)=N_1$.

Despite the validity information being unsigned, the scheme is secure because given $c_i$, it is infeasible to compute the subsequent tokens $c_{i+1}$, $c_{i+2}$, . . . .

Figure 3:
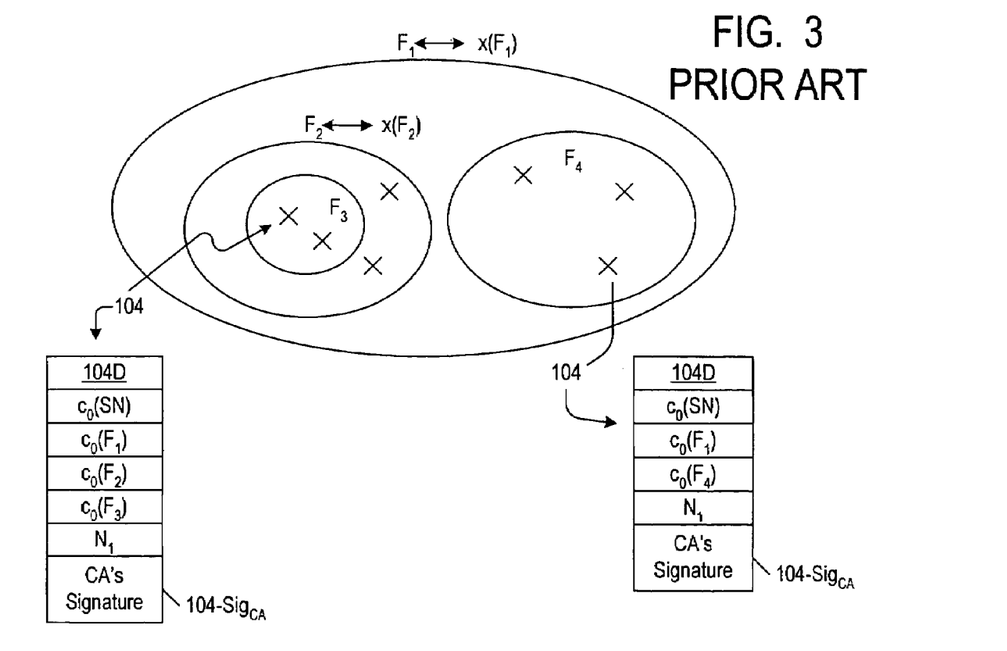
FIGS. 3, 4 illustrate sets of certificates for prior art certificate revocation schemes.

To reduce the communication between CA 120 and directories 210, a hash chain (1) can be generated for a set of certificates 104, and a single i-token $c_i$ can be distributed for the set if the set is "unrevoked" (i.e. all the certificates are unrevoked in the set). FIG. 3 illustrates certificate sets $F_1$ through $F_4$. $F_1$, is the set of all the certificates 104; $F_2 \subset F_3 \subset F_1$ and $F_4 \subset F_1$. In addition to the seed numbers x, $N_0$ for each certificate 104, CA 120 generates random seed numbers $x(F_i)$, $N_0(F_i)$ for each set $F_i$ and constructs a hash chain (1) from each number $x(F_i)$, with a validation target $c_0(F_i)=f^{366}(x(F_i))$. Each certificate 104 is augmented with the targets $c_0(F_i)$ for each set $F_i$ containing the certificate.

Every day i, if all the certificates are valid, CA 120 distributes to directories 210 only the i-token $c_i(F_1)$. If only the set $F_3$ has invalid certificates, CA 120 distributes the i-tokens for the set $F_4$ and for all the valid certificates in the set $F_2$. If only the set $F_2$-$F_3$ has invalid certificates, CA 120 distributes the i-tokens for the sets $F_3$ and $F_4$ and for all the valid certificates in $F_2$-$F_3$, and so on.

In response to a validity status request for a certificate 104, a directory 120 sends to the requester (the verifier):
1. an i-token $c_i$; for the certificate or for a set $F_i$ containing the certificate if the certificate is valid;
2. the certificate's revocation number $N_0$ if the certificate has been revoked.

If the response indicates that the certificate is valid, the verifier checks that $f^i(c_i)$ is equal to one of the certificate's validation targets. If the response indicates that the certificate is revoked, the verifier checks that $f(N_0)=N_1$ for the certificate.

Clearly, for each set R of revoked certificates (FIG. 4), it is desirable to find a minimum set of sets $F_i$ covering the valid certificates R'. By definition herein, the sets $\{F_i\}$ "cover" R' if the union $\cup F_i = R'$. We will say that $\{F_i\}$ is the "complement cover" of R. The complement cover of R will be denoted as $CC_R$.

Also, it is desirable to find a system of sets $\{F\}$ containing a small complement cover for any set R or at least for many possible sets R. If $\{F\}$ contains a cover for each set R of the certificates, we will call $\{F\}$ a complement cover for the set of all the certificates, and will denote this complement cover CC(U) or just CC.

For uniformity, we will assume that each certificate 104 corresponds to a singleton set consisting of that certificate. The hash chain for the singleton set is the same as for the certificate.

Clearly, if $\{F\}$ contains the singleton set for each certificate, then $\{F\}$ is a complement cover for the set of all the certificates.

Figure 5:
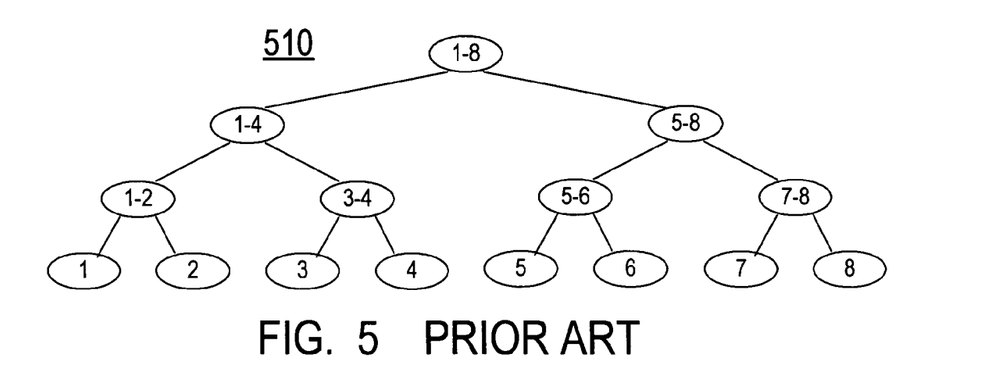
FIGS. 5, 6 illustrate computer data structures for prior art certificate revocation schemes.

Complement covers can be constructed using trees. FIG. 5 illustrates a binary tree 510 for eight certificates, numbered 1 through 8. Each node represents a set $F_i$. Each leaf node (labeled 1, 2, . . . ) represents a singleton set for a respective certificate 1, 2, . . . . Each higher level node represents the union of its children. E.g., node 1-4 represents the set of certificates 1 through 4. The root represents all the certificates. (We will use the numeral 510 to represent both the tree and the complement cover.)

Figure 6:
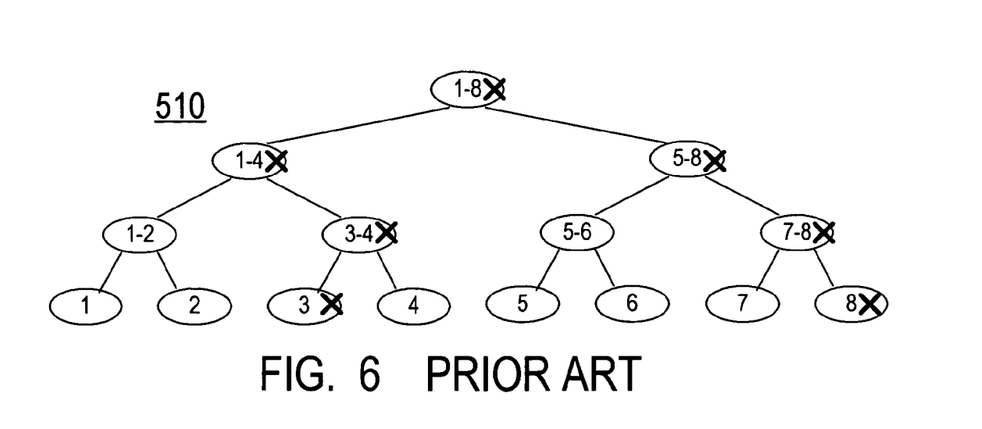

If a certificate is revoked, then the corresponding leaf is revoked, i.e. represents a set that cannot be used for the i-token distribution. Also, each node in the path from the leaf to the root is revoked. In the example of FIG. 6, the certificates 3 and 8 are revoked (as indicated by "x" marks). The sets 3-4, 1-4, 1-8, 7-8, 5-8 are therefore revoked. The minimal complement cover $CC_R$ of the revoked certificates consists of nodes 1-2, 4, 5-6, 7. Generally, the minimal complement cover $CC_R$ consists of all the nodes that are children of the revoked nodes. Computer tree traversal algorithms are known that can be implemented on CA 120 to mark revoked nodes when a certificate is revoked, and to find all the immediate unrevoked children of the revoked nodes. Each day CA 120 distributes the i-tokens for the immediate children and the $N_0$ tokens for the revoked leafs.

SUMMARY

This section summarizes some features of the invention. Other features are described in the subsequent sections. The invention is defined by the appended claims which are incorporated into this section by reference.

In some embodiments of the present invention, the validity proofs are encrypted by the CA and provided to "prover" systems in an encrypted form at the set-up time. A prover system is any system that will provide the validity proofs to verifiers 110. The prover system can be a directory 210 or the certificate owner's system 110. Let $c_j(i)$ denote a validity proof that a certificate 140.i is valid, wherein the validity proof is to be provided in a period j. The proof $c_j(i)$ can be the token $c_i$ as in FIG. 2, or can be some other proof, for some other certificate validation system. For each certificate 140.i, the CA encrypts all the validity proofs $c_j(i)$ for all the periods j, and provides the encrypted proofs $E_{ij}(c_j(i))$ to the provers. In some embodiments, the decryption of $E_{ij}(c_j(i))$ requires a different key $K_{ij}$ for each certificate 140.i and each period j. Symmetric encryption can be used, but is not necessary.

The certificate re-validation is performed as follows. At the start of, or shortly before, each period j, CA 120 distributes decryption key data used by the provers to obtain the decryption keys $K_{ij}$ for the valid certificates 140.i. The provers decrypt the encrypted validity proofs $c_j(i)$ and provide the proofs $c_j(i)$ to verifiers as needed.

Figure 4:
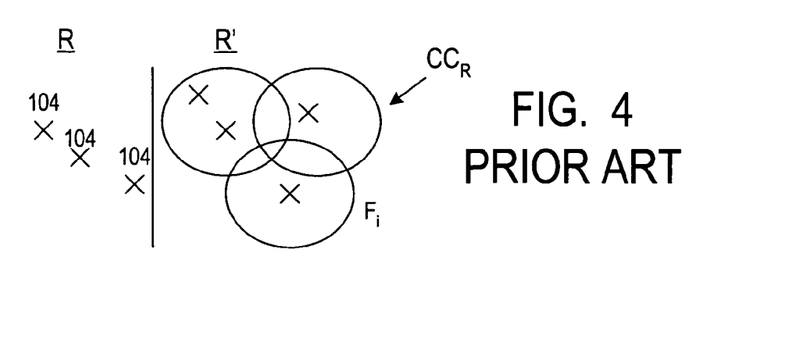

In some embodiments, multi-certificate revocation is performed using a complement cover CC as in FIG. 4 or 5. At the set-up time, CA 120 associates each set F in CC and each period j with a decryption key $K_{Fj}$. Also, for each certificate 140.i, for each period j, CA 120 encrypts the proof $c_j(i)$ into $E_{ij}(c_j(i))$ such that the decryption can be performed using the key $K_{Fj}$ for any set F containing the certificate 140.i. The encrypted proofs $E_{ij}(c_j(i))$ are transmitted to the provers. For re-validation in a period j, CA 120 constructs a complement cover $CC_R$ for the set R of the revoked certificates, and publishes the keys $K_{Fj}$ for the sets F in this complement cover.

Advantageously, if the proofs $c_j(i)$ are as in equations (1), then each certificate 140.i needs only one revocation target $c_0$. More generally, in some embodiments, the multi-certificate revocation system can be built on top of a single-certificate revocation system without changing the format of the certificates.

In some embodiments, the keys are generated as follows. At the set-up time, for each certificate 140.i, each validity proof $c_j(i)$ is encrypted under the respective key $K_{ij}$ corresponding to the certificate, i.e. under the key $K_{Fj}$ corresponding to the singleton set F containing the certificate. The keys are set up so that, for each period j, the key $K_{ij}$ for certificate 140.$i$ can be obtained from the key $K_{Fj}$ of any set F containing the certificate. During the re-validation, the prover receives a key $K_{Fj}$ for the period j for some set F containing the certificate. The prover computes the key $K_{ij}$ and uses it to decrypt the encrypted $c_j(i)$ value.

In some embodiments, for each period j, the corresponding key $K_{ij}$ is a constructed from key data distributed by CA 120 not just for the period j but also for some or all of the preceding periods 1 through j−1. During the re-validation, in each period j, CA 120 constructs the complement cover $CC_{j-1}$ for the set of the certificates revoked in the previous period j−1. This complement cover may be smaller than $CC_R$. CA 120 distributes the key data only for the sets in $CC_{j-1}$. If $CC_{j-1}$ is smaller than $CC_R$, the amount of information distributed by CA 120 during the re-validation will be reduced. If the complement cover $CC_{j-1}$ contains an invalid certificate, the certificate's validity proof cannot be decrypted because the CA 120 did not provide the decryption key data for the invalid certificate for at least one of the previous periods 1 through j−1.

Some embodiments of the invention are particularly suitable for ad hoc networks. Ad hoc networks are wireless self-configuring networks of mobile routers 110. Examples include wireless sensor networks in which some nodes 110 are provided with sensors for sensing some physical conditions. Examples include seismic sensors. These nodes can be dropped onto a geographical area in a random manner. These nodes may have limited connectivity because they may be capable of transmitting only a weak signal that can be "heard" only by nodes in close proximity to the transmitting node. Also, the nodes may have only incomplete knowledge of the network topology. The network may be part of a larger network. Ad hoc networks may also be formed by computers 110 installed on moving vehicles (cars, airplanes, etc.). In some embodiments, the decryption key data are distributed via a multicast transmission to a group of physically adjacent (clustered) nodes. The complement covers $CC_R$ or $CC_{j-1}$ are constructed so that the physically adjacent nodes are likely to be provers for certificates in the same set F in the complement cover. Since the provers for certificates in the same set F receive the same decryption key data, the decryption key data distribution becomes efficient from the CA's perspective if these provers are physically so close to each other as to be able to communicate with each other. In this case, CA 120 transmits the decryption key data for these nodes to one of these nodes only. This node transmits the decryption key data to the remaining provers in the group.

The invention is not limited to the features and advantages described above. Other features are described below. The invention is defined by the appended claims.

DESCRIPTION OF SOME EMBODIMENTS

The embodiments described in this section illustrate but do not limit the invention. The invention is defined by the appended claims.

In the following description, numerous details are set forth. However, the present invention may be practiced without these details. Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or some computing device, that manipulates and transforms data represented as physical (electronic) quantities within the computer system's registers and other storage into other data similarly represented as physical quantities within the computer system storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system.

The algorithms presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein. A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 7:
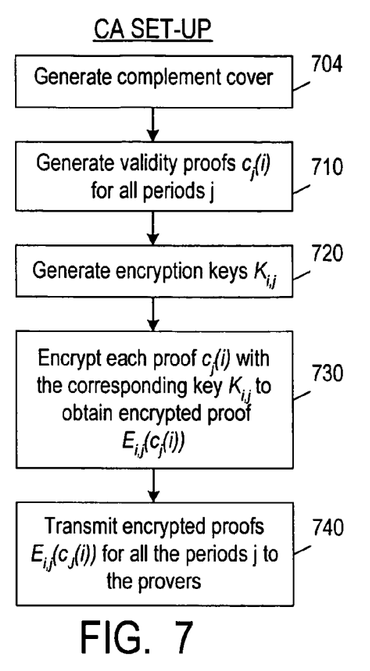
FIG. 7 is a flowchart of operations performed by a certification authority according to some embodiments of the present invention.

FIG. 7 illustrates the CA set up stage in some embodiments of the present invention. At step 704, CA 120 generates complement cover data 804 (FIG. 8) which define a complement cover CC for the set of all the certificates 104 (or for a larger set, with empty slots for certificates to be created; see U.S. patent application Ser. No. 11/218,093 filed Aug. 31, 2005, and PCT application no. PCT/US2005/031251 filed Aug. 31, 2005, both incorporated herein by reference). At step 710, for each certificate 140.$i$, CA 120 generates the validity proofs $c_j(i)$ for all the periods j. CA 120 stores, in its storage 824 (FIG. 8), either the validity proofs $c_j(i)$ or some validity proof data from which the validity proofs can be generated. For example, for equations (1), the validity proof data may consist of the seed values x. CA 120 may also store revocation proof data (e.g. $N_0$).

Figure 8:
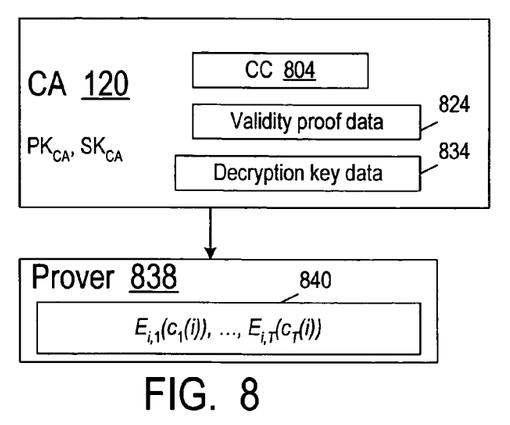
FIG. 8 illustrates computer systems and computer data structures for certificate revocation schemes according to some embodiments of the present invention.

At step 720, CA 120 generates suitable encryption keys $K_{ij}$ for each certificate 140.$i$ for each period j. For simplicity, we will assume symmetric encryption, i.e. that the encryption keys are also the decryption keys. CA 120 stores the decryption keys or some decryption key data from which the decryption keys can be generated, as shown at 834 in FIG. 8. At step 730 (FIG. 7), CA 120 encrypts each proof $c_j(i)$ with the corresponding key $K_{ij}$ to obtain an encrypted proof $E_{ij}(c_j(i))$. At step 740, for each certificate 140.$i$, CA 120 transmits the encrypted proofs $E_{ij}(c_j(i))$ for all the periods j to the associated prover 838 (FIG. 8). The prover 838 will provide validity proofs for the certificate 140.$i$. In some embodiments, the encrypted proofs $E_{ij}(c_j(i))$ are signed by CA 120, and the signatures are also transmitted to the prover. The prover stores the encrypted proofs in its storage as shown at 840 in FIG. 8 (FIG. 8 assumes that the j index varies from 1 to some number T.)

Figure 9:
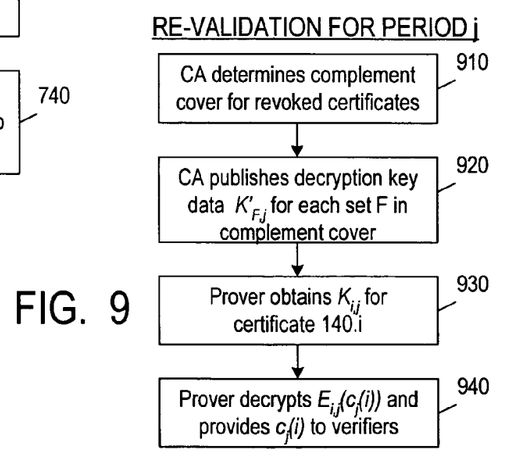
FIG. 9 is a flowchart of operations performed according to some embodiments of the present invention.

FIG. 9 illustrates certificate re-validation for some period j. At step 910 performed at the start or shortly before the period j, CA 120 constructs a complement cover $CC_R$ for the set of revoked certificates. At step 920, for each set F in the complement cover, CA 120 transmits some decryption key data $K'_{Fj}$ to those provers 838 which are associated with the certificates 140 in the set F. In some embodiments, the decryption key data $K'_{Fj}$ are distributed in plaintext. At step 930, for each certificate 140.$i$, the corresponding prover 838 obtains the decryption key $K_{ij}$ from the decryption key data $K'_{Fj}$. In some embodiments, $K'_{Fj}=K_{ij}$ (e.g., the encryption $E_{ij}(c_j(i))$ may contain an encryption of $c_j(i)$ under the key $K'_{Fj}$ for each set F in CC such that F contains the certificate 140.$i$), but this is not necessary as explained in more detail below. At step 940, the prover decrypts $E_{ij}(c_j(i))$ with the key $K_{ij}$, obtaining the proof $c_j(i)$. The prover can provide the proof $c_j(i)$ to verifiers as needed (e.g. in response to a request or on some other event). The verifiers can confirm the certificate validity using procedures established for the underlying certificate validation system.

For each invalid certificate, CA 120 distributes the corresponding revocation proof (e.g. $N_0$ if the underlying validation scheme is as in FIG. 2). The revocation proof can be distributed to the corresponding prover 838, or to the verifiers 110, either upon a request or on some other event. In another embodiment, CA 120 does not perform any action for the revoked certificates. The verifier assumes that the certificate is revoked if a proof of the certificate's validity is unavailable.

Advantageously, if the certificate proofs are as in FIG. 2, each certificate 140 can contain only one revocation target $c_0$. Further, the multi-certificate revocation scheme of FIGS. 7-9 can be built on top of a single-certificate revocation scheme, using the validity proofs $c_j(i)$ for the single certificates and without changing the certificates.

We will now describe some embodiments for constructing the decryption keys $K_{ij}$. In some embodiments, for any set F in CC, the key data $K'_{Fj}$ for any given period j is sufficient to derive the key data for any subset of F for the same period j. The derivation can be performed using public information, e.g. a public hash function H. The function H can be a cryptographic compression function that takes as input a b-bit payload and a v-bit initialization vector IV and produces a v-bit output. In some embodiments, $b \geq 2v$. We will assume that the cryptographic compression functions mentioned below can be collision resistant, i.e. it is difficult to find two distinct inputs $m_1 \neq m_2$ such that $H(IV, m_1)=H(IV, m_2)$. We will assume that IV is fixed and publicly known, and we will sometimes omit it for notational simplicity. Practical examples of such cryptographic compression functions are SHA-1 [26] (output size is 20 bytes) and MD5 [28] (output size 16 bytes), both having a 64-byte payload. For simplicity, we will use the term "hash function" instead of compression function. The term "hash function" can also denote a mapping form $\{0,1\}^*$ into $\{0,1\}^v$ for some fixed v, where $\{0,1\}^*$ denotes the set of all the binary strings. Hash functions are typically one way and collision resistant, but the invention is not limited to such functions.

Figure 10:
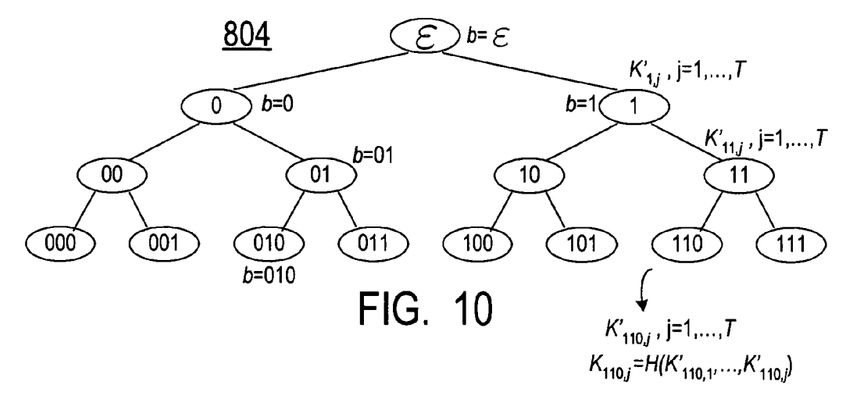
FIG. 10 illustrates computer data structures for certificate revocation schemes according to some embodiments of the present invention.

The key construction will now be explained on the example of a tree-based complement cover 804 of FIG. 10, which is similar to the complement cover of FIG. 5. The sets F (the tree nodes) are labeled with bit strings b for convenience. The root is associated with the empty bit string b=ϵ. The root's left child is labeled with b=0, and the right child with b=1. In general, for any parent node with a label b, the left child is labeled with b0 (appending 0 on the right) and the right child with b1.

With this labeling scheme, if b is a label of a set F containing multiple certificates, then each of these certificates (i.e. each of the corresponding singleton sets) has a label beginning with b. For example, the set b=11 consists of the certificates with labels b=110 and b=111, both labels beginning with 11.

Let $K'_{bj}$ denote the decryption key data for the set labeled b for the period j. These data are generated by CA 120 at step 720 as follows. CA 120 selects a secret seed value $s_j$ for the period j. The values $s_j$ can be randomly generated, or can be computed from a single seed value to save storage, or selected in any other suitable way. Then, for the root node b=ϵ, CA 120 sets:

$$K'_{\epsilon j}=s_j \qquad (2)$$

For every other label b, let $b_{(k)}$ denote the k-th bit of b. Suppose b has some number h of bits, i.e. $b=b_{(1)}b_{(2)} \ldots b_{(h)}$. Then CA 120 computes:

$$K'_{bj}=H(b_{(h)}, \ldots, H(b_{(2)}, H(b_{(1)}, s_j)) \ldots ) \qquad (3)$$

In other words, the function H is applied iteratively h times. At each subsequent iteration, H is applied to the next bit of $b_{(i)}$ concatenated with the H value obtained in the previous iteration. If a bit string $b_1$ begins with a sub-string $b_2$ (i.e. the set $b_1$ is a subset of $b_2$), then for any given j one can derive $K'_{b_1,j}$ from $K'_{b_2,j}$. For example, if $b_1=b_2 b_{(m)} \ldots b_{(h)}$, then $$K'_{b_1,j} = H(b_{(h)}, \ldots, H(b_{(m)}, K'_{b_2,j}) \ldots) \quad (4)$$

Of note, equation (4) is true even if $b_2 = \epsilon$ (empty string).

At step 720, CA 120 computes the encryption/decryption keys $K_{bj}$ for the singleton sets b as follows:

$$K_{bj} = H(K'_{bj}, \ldots, K'_{b,1}) \quad (5)$$

The function H in (5) can be the same as in (3) or can be a different hash function. In some embodiments, the function H in (5) is not a hash function but is simply some function that binds the key data $K'_{bj}, \ldots, K'_{b,1}$. For example, the function H in (5) can be an addition or an exclusive-OR operation on the key data $K'_{bj}, \ldots, K'_{b,1}$.

Since all the keys $K_{ij}$ can be generated from $K'_{\epsilon j}$ for $j=1, \ldots, T$, the CA's decryption key data storage 834 stores only the key data $K'_{\epsilon j}$ in some embodiments.

The certificate re-validation is performed as follows. At step 910 (FIG. 9), at or shortly before each period j, CA 120 determines the complement cover $CC_{j-1}$ of the set of all the certificates that have not been revoked in the immediately preceding period j−1 (if j=1, $CC_{j-1}$ may consist of the root node $\epsilon$, i.e. the set of all the certificates). This will sometimes be a smaller cover than the cover $CC_R$ for the set of all the revoked certificates. For example, if no certificates were revoked in the period j−1, then $CC_{j-1}$ will consist of the single set of all the certificates. At step 920, for each set labeled b in $CC_{j-1}$, the CA publishes the pairs $(b, K'_{bj})$. Publishing the pairs $(b, K'_{bj})$ may involve CA 120 sending the key pairs to those provers 838 that are associated with the certificates 140 in the set b. In some embodiments, CA 120 distributes these pairs in plaintext, and/or makes them publicly available to any system 110, 210.

At step 930, for a valid certificate 140.i corresponding to a singleton set with a label $b_i$, the corresponding prover 838 obtains the key data $K'_{b_i,j}$ as follows. If $b_i$ is in $CC_{j-1}$, then the prover received $K'_{b_i,j}$ at step 920. If $b_i$ is not in $CC_{j-1}$, then $b_i$ belongs to a set b in $CC_{j-1}$ such that the label $b_i$ begins with b. The prover received $(b, K'_{bj})$ at step 920. In this case, the prover checks that $b_i$ begins with b, and computes $K'_{b_i,j}$ from $K'_{bj}$ using equation (4).

Since the certificate is valid, the prover must have received the key data $K'_{F(m),m}$ for the certificate for each period m=1, ..., j−1 for some sets F(m) containing the certificate. Therefore, the prover 838 has computed, or can compute, the key data $K'_{b_i,m}$ for the periods m=1, ... j−1. At step 930, the prover obtains the key $K_{b_i,j}$ from equation (5). Step 940 (decryption) is then performed by the prover as described above.

In some embodiments, to enable the prover to perform the re-validation, the prover is provided with the $b_i$ value for the certificate at the CA set-up time. At step 704 (FIG. 7), the CA 120 assigns to each certificate 140.i a leaf position $b_i$ in the tree of FIG. 10. At step 740, CA 120 sends to the user's system 110 (or some other prover system 838) the following data:

$$(c_0, \text{Sig}(Ui, b_i, c_0), E_{K_{bi,1}}(c_1(i)), \ldots, E_{K_{bi,T}}(c_T(i))) \quad (6)$$

where Ui is the certificate's serial number or some other identifier embedded in the certificate and/or available to the prover, $\text{Sig}(Ui, b_i, c_0)$ denotes a combination of the data (Ui, $b_i, c_0$) and a signature on these data with the CA's secret key $SK_{CA}$, and $E_{K_{bi,j}}(c_j(i))$ denotes symmetric encryption of $c_j(i)$ under the key $K_{b_i,j}$. The first term $c_0$ in (6) can be omitted if the prover system 838 has the certificate, because $c_0$ is part of the certificate. The system 838 stores these data in its storage 840.

In some embodiments, a user may join the system after the initial set-up procedure of FIG. 7. As mentioned above, the complement cover 804 may include empty slots for the users who join late. The set-up procedure of FIG. 7 is repeated for the users joining late.

Equations (2)-(6) can be modified in many ways. For example, in equation (3), the application of the function H and the concatenation with a bit of b can be interchanged $(K=b_{(h)} H( \ldots b_{(2)} H(b_{(1)} H(s_j)) \ldots ))$. Other variations are also possible.

From the perspective of the users, the advantage of this scheme is that it is possible to use this encryption approach in connection with any certificate validation scheme. For example, if this approach is used with the Novomodo scheme of FIG. 2, the users can retain the Novomodo advantage of a compact validation target $c_j$ (just a single hash pre-image, regardless of how many time periods or how many users there are), while at the same time the CA can enjoy the efficiency advantages of multi-certificate validation. Moreover, the embodiment of equations (2)-(6) performs better than the embodiment described above in connection with FIG. 4 from the CA's perspective, since the size of the complement cover in a given time period j is dictated by the number of revocations $r_j$ that occur within the preceding time period j−1, rather than the total number of revocations r that have occurred in the lifetime of the revocation system (across multiple time periods). Thus, asymptotically, the amount of information that the CA needs to transmit for each period is essentially $O(r_j \log(n/r_j))$ in some embodiments, rather than the larger value $O(r \log(n/r))$. Of course, each prover 838 (e.g. each user system 110) has to cache its associated encrypted proofs $E_{ij}(c_j(i))$. However, since this is a one-time set-up cost, and since these values do not need to be changed, they can be handled using efficient techniques such as storing them in non-volatile read-only memory.

In some embodiments, the techniques of FIGS. 7-10 are used with hash tree validation schemes, e.g. grounded dense hash trees, in which the hash chains (1) are replaced with tree structures. See e.g. PCT publication WO 2005/029445 published on 31 Mar. 2005, incorporated herein by reference. The invention is not limited to the underlying validation scheme as stated above.

In some networks such as ad hoc networks, the most suitable method for distributing the key data $K'_{ij}$ from the CA's perspective may depend on certain factors, such as the mobility of the user systems 110.i in the network (assuming each prover 838 is a user system 110.i) and how much information the CA has about the topology of the network (new nodes may join the network at odd times, and CA may not yet be aware of the new nodes). If the CA has complete topology information, it may transmit the decryption key data to each associated prover in the network.

If the provers 110 are, after a certain point in time, essentially static (not moving), then the CA may be able to use this fact to improve the distribution efficiency. This situation may pertain, for example, to a wireless network of mobile sensor nodes that might be dropped out of an airplane, fall to the ground, and thereafter be essentially static. In the validation scheme of FIG. 10, at step 704 (FIG. 7), CA 120 arranges the user systems (i.e. the certificates, assuming each user system 110 corresponds to a single certificate) as leaves in a binary tree (for example). Then, during certificate re-validation, if some user systems 110 are "close" to each other in the binary tree, these user systems may receive the same key data $K'_{ij}$. Therefore, it is desirable to position the user systems in the binary tree in a manner that is consistent with how the user systems are positioned topologically. The user systems that are physically close to each other should be positioned close to each other in the tree 804 of FIG. 10. Then, after finding the appropriate complement cover $CC_R$ or $CC_{j-1}$ and generating the associated decryption key data $K'_{Fj}$, the CA may need to transmit the decryption key data $K'_{Fj}$ for each set F only once to one member of the cluster of nodes 110 that belong to the set F; this member can forward the decryption key data to the nearby nodes in its cluster. Altogether, in this situation, the CA may use the following approach to certificate validation:

1. For the time before the topology is fixed, the CA uses an initial certification scheme with a binary tree constructed in some way without using any information on how close the systems 110 are to each other;

2. The topology then becomes relatively fixed;

3. The nodes 110 report their positions back to the CA, using their signing keys and the initial certification scheme to authenticate themselves;

4. Thereafter, the CA re-builds the binary tree 804 in a manner that is consistent with the topology of the network (with physically adjacent nodes being close to each other in tree 804); as a result, for at least one group of clustered systems 110, the number of sets F containing the group is increased without changing the total number of sets F in the complement cover;

5. The CA transmits new data (6) to the nodes and thereafter uses the new, topology-based binary tree to perform certificate validation.

There are different ways by which the CA may make its binary tree consistent with the network topology. If the nodes 110 report back their local connectivity (i.e., the identities of the nodes that they can "hear" from their position), then the CA can use that information to recursively bisect the network into connected subnetworks first bisecting the network into two intra-connected comparably-sized halves and associating each half with half of the binary tree, bisecting each half into two intra-connected comparably-sized sub-halves and associating each of these sub-halves with half of the appropriate half of the binary tree, and so on. As it is building this tree, it can also log the efficient routes that the certification validation information can traverse—e.g., from one node that is designated the midpoint hub of the tree/topology, to each of two nodes that are designated the hubs of their respective subtrees, and so on. It may then give this routing information to the nodes, which they can use.

In the embodiments described above, the CA 120, the directories 210, the systems 110, and the provers 838 can be computer systems communicating with each other over a network or networks. Each of these systems may itself be a computer system having components communicating over networks. Each computer system includes one or more computer processors executing computer instructions and manipulating computer data as described above. The term "data" includes "computer data" and covers both computer instructions and computer data manipulated by the instructions. The instructions and data can be stored on a data carrier such as a computer storage, i.e. a computer readable medium (e.g. a magnetic or optical disk, a semiconductor memory, and other types of media, known or to be invented). The data carrier may include an electromagnetic carrier wave transmitted over a network, e.g. through space, via a cable, or by some other means. The instructions and data are operable to cause the computer to execute appropriate algorithms as described above.

The invention is not limited to the embodiments described above. For example, the values $c_j(i)$ may represent only a portion of the validity proof. The other portion may be transmitted by CA 120 during the certificate re-validation or obtained by the prover 838 or the verifier 110 in some other manner. Also, the validity proof may be some function of $c_j(i)$ rather than the value $c_j(i)$ itself. We will refer to $c_j(i)$ generally as "validity proof data", i.e. the data used to obtain the validity proof.

The invention is not limited to any particular number of certificates. The number of certificates does not have to be a power of 2 as in FIG. 10. The complement cover of FIG. 10 can be replaced with non-binary-tree type covers and with complement covers not represented as trees. The invention is not limited to any particular hash functions, or to cryptographic functions (which are easy to compute but are one-way or collision resistant). In some embodiments, it is desirable that a function f or H be collision resistant not in the sense that it is difficult to find different x and y with the same image but in the sense that if x and y are uniformly drawn from the function's domain, the probability is small that they both will have the same image:

$$P\{H(x)=H(y)\} \leq \alpha$$

where $\alpha$ is a small constant (e.g. $\frac{1}{10}$, or $\frac{1}{100}$, or $2^{-25}$, or $2^{-50}$, or $2^{-80}$, or $2^{-160}$, or some other value). Some or all of the techniques used for validity proofs can also be used for invalidity proofs and vice versa. The CA, the Sub-CAs, the directories and the systems 110 may include software-programmable or hardwired computer systems interconnected via a network or networks. Each function f or H represents an evaluation method performed by a computer system. The invention is not limited to the step sequences shown in the flowcharts, as the step order is sometimes interchangeable and further different steps may be performed in parallel. Other embodiments and variations are within the scope of the invention, as defined by the appended claims.

All of the following references are incorporated herein by reference.

[1] W. Aiello, S. Lodha, and R. Ostrovsky. Fast digital identity revocation. In *Proc. of CRYPTO '98*, 1998.

[2] G. Ateniese, J. Camenisch, M. Joye, and G. Tsudik. A Practical and Provably Secure Coalition-Resistant Group Signature Scheme. In *Proceedings of CRYPTO 2000*, 2000.

[3] M. Bellare and P. Rogaway. Random oracles are practical: A paradigm for designing efficient protocols. In *Proc. First Annual Conference on Computer and Communications Security*, ACM, 1993.

[4] D. Boneh, B. Lynn, and H. Shacham. Short signatures from the Weil pairing. In *Proceedings of Asiacrypt '01*, 2001.

[5] F. Elwailly and Z. Ramzan. QuasiModo: More Efficient Hash Tree-Based Certificate Revocation. Manuscript, 2003.

[6] I. Gassko, P. S. Gemmell, and P. MacKenzie. Efficient and fresh certification. In Proceedings of $PK_C$ 2000, 2000.

[7] S. Goldwasser, S. Micali, and R. L. Rivest. A Digital Signature Scheme Secure Against Adaptive Chosen-Message Attacks. SIAM Journal on Computing, 17(2):281-308, 1988.

[8] Y-C. Hu, A. Perrig, and D. Johnson. Efficient security mechanisms for routing protocols. In proceedings of the 10th Annual Network and Distributed System Security Symposium (NDSS), 2003.

[9] M. Jakobsson, J-P. Hubaux, and L. Buttyan. A micropayment scheme encouraging collaboration in multi-hop cellular networks. In *Proceedings of the 7th International Conference on Financial Cryptography,* 2003.

[10] M. Jakobsson, T. Leighton, S. Micali, and M. Szydlo. Fractal merkle tree representation and traversal. In *Proceedings of the Cryptographer's Track,* RSA Conference., 2003.

[11] S. Jarecki and A. Odlyzko. An efficient micropayment system based on probabilistic polling. In *Proceedings of the 1st International Conference on Financial Cryptography,* 1997.

[12] Robert Johnson, David Molnar, Dawn Xiaodong Song, and David Wagner. Homomorphic signature schemes. In CT-RSA, pages 244-262, 2002.

[13] C. Jutla and M. Yung. PayTree: Amortized signatures for flexible micropayments. In *Proceedings of the second USENIX workshop on electronic commerce,* 1996.

[14] S. Kim and H. Oh. An atomic micropayment system for a mobile computing environment. *IEICE Transactions of Information and Systems,* E84-D(6):709-716, 2001.

[15] P. Kocher. On Certificate Revocation and Validation. In *Proceedings of the 2nd International Conference on Financial Cryptography,* 1998.

[16] Satoshi Koga and Kouichi Sakurai. A distributed certificate status protocol with single public key. In *Proceedings of PKC* 2004, pages 389-401, 2004.

[17] R. J. Lipton and R. Ostrovsky. Micro-Payments via Efficient Coin Flipping. In *Proceedings of the 2nd International Conference on Financial Cryptography,* 1998.

[18] A. Malpani, R. Housely, and T. Freeman. Simple Certificate Validation Protocol-(SCVP). In *IETF Draft—draft-ietf-pkix-scvp*-12. txt, June 2003.

[19] R. C. Merkle. Protocols for Public-Key Cryptography. In *IEEE Symposium on Security and Privacy,* 1980.

[20] S. Micali. Efficient Certificate Revocation. MIT/LCS/TM 542b, Massachusetts Institute of Technology, 1996.

[21] S. Micali. Efficient Certificate Revocation. In *Proceedings of the RSA Data Security Conference,* 1997. Also U.S. Pat. No. 5,666,416.

[22] S. Micali. NOVOMODO: scalable certificate validation and simplified PKI management. In *Proceedings of the 1st Annual PKI Research Workshop,* 2002.

[23] M. Myers, R. Ankney, A. Malpani, S. Galperin, and C. Adams. X.509 internet public key infrastructure Online Certificate Status Protocol—OCSP. In *Internet RFC* 2560, June 1999.

[24] M. Naor and K. Nissim. Certificate Revocation and Certificate Update. In *Proceedings of USENIX Security,* 1998.

[25] National Bureau of Standards. NBS FIPS PUB 81: DES modes of operation. 1980.

[26] National Institute of Standards. FIPS 180-1: Secure hash standard. 1995.

[27] M. Pierce and D. O'Mahony. Micropayments for Mobile Networks. In *Proceedings of European Wireless,* 1999. Winner of Best Paper Award.

[28] R. L. Rivest. The MD5 message digest algorithm. In *Internet RFC* 1321, April 1992.

[29] R. L. Rivest. Electronic Lottery Tickets as Micropayments. In *Proceedings of the 2nd International Conference on Financial Cryptography,* 1997.

[30] R. L. Rivest and A. Shamir. PayWord and MicroMint—Two Simple Micropayment Schemes. *CryptoBytes (RSA Laboratories),* 2(1), 1996. Proceedings of 1996 International Workshop on Security Protocols.

[31] R. L. Rivest, A. Shamir, and L. Adleman. A Method for Obtaining Digital Signatures and Public-Key Cryptosystems. *Communications of the ACM,* 21:120-126, 1978.

[32] Ron Steinfeld, Laurence Bull, and Yuliang Zheng. Content extraction signatures. In *Proceedings of the 4th International Conference Seoul on Information Security and Cryptology,* pages 285-304. Springer-Verlag, 2002.

[33] H. Tewari and D. O'Mahony. Multiparty Micropayments for Ad-Hoc Networks. In *Proceedings of the IEEE Wireless Communications and Networking Conference (WCNC),* 2003.

[34] H. Tewari and D. O'Mahony. Real-Time Payments for Mobile IP. *IEEE Communications,* 41(2):126-136, 2003.

[35] D. Wheeler. Transactions Using Bets. In *Proceedings of Fourth Cambridge Workshop on Security Protocols,* 1996.

[36] J. Zhou and K-Y. Lam. Undeniable Billing in Mobile Communication. In *Proceedings of MOBICOM,* 1998.

The invention claimed is:

1. A computer implemented method for generating computer data for verifying validity and/or invalidity of digital certificates in a plurality of periods of time, each digital certificate certifying that a cryptographic key is associated with an entity, the digital certificates including a first digital certificate, the method comprising:
 (a) obtaining first data defining a plurality of sets, each set being a set of one or more of the digital certificates, the plurality of sets comprising a first plurality of sets, wherein the first digital certificate belongs to each set in the first plurality, wherein at least one set of the first plurality comprises two or more digital certificates;
 (b) obtaining second data which define, for each of said certificates and each of said periods of time, associated proof data for proving validity or invalidity of the certificate in the period of time;
 (c) obtaining third data which define, for each said certificate and each said period of time T1, an encryption key for encrypting the proof data associated with the certificate and the period T1;
  (c1) wherein for each said set containing the certificate, the third data also define decryption key data associated with the set and the period T1, the decryption key data being for computing a decryption key for each certificate in the set and for the period T1 from the decryption key data associated with the set and one or more of the periods of time which are not later than the period T1 and which include T1, wherein the decryption key associated with the certificate and the period T1 is computable from the decryption key data associated with any given one of the sets containing the certificate and with one or more of the periods of time which are not later than the period T1 and which include the period T1;
 (d) wherein for at least one said period of time, at least two sets of the first plurality of sets are associated with respective different decryption key data, and in at least one set of the first plurality, the first digital certificate and at least one other digital certificate are associated with different decryption keys.

2. The method of claim 1 further comprising, for each of said certificates and each of said periods of time, encrypting the associated proof data for decryption with one or more of the decryption keys.

3. The method of claim 1 wherein for at least one certificate and at least one period of time, the associated decryption key for decrypting the associated proof data depends on decryption key data associated with multiple periods of time.

4. A computer system adapted to perform the method of claim 1.

5. A computer readable medium comprising one or more computer instructions operable to perform the method of claim 1.

6. A computer implemented method for enabling generation of proofs of validity or invalidity of digital certificates and providing said proofs in a first period of time which is one of a plurality of periods of time, each digital certificate certifying that a cryptographic key is associated with an entity, the digital certificates including a first digital certificate, the method comprising:
   (a) obtaining first data defining a first complement cover for a set comprising all of said digital certificates, the first complement cover comprising a first plurality of sets, wherein the first digital certificate belongs to each set in the first plurality, wherein at least one set of the first plurality comprises two or more digital certificates;
      (a1) wherein each said certificate and each said period of time are associated with a decryption key for decrypting proof data for proving validity or invalidity of the certificate in the period of time;
      (a2) wherein each said set and each said period of time are associated with decryption key data;
      (a3) wherein for each said certificate and each said period of time T1, the associated decryption key is computable from the decryption key data associated with any given one of the sets containing the certificate and with one or more of said periods of time including the period T1;
      (a4) wherein for at least one said period of time, at least two sets of the first plurality are associated with respective different decryption key data, and in at least one set of the first plurality, the first digital certificate and at least one other digital certificate are associated with different decryption keys;
   (b) selecting, from the first complement cover, a second complement cover which is a complement cover for a set of invalid digital certificates, said set of invalid digital certificates not including the first digital certificate, the second complement cover comprising at least one set of the first plurality of sets;
   (c) for each set in the second complement cover, transmitting decryption key data over a network, the decryption key data being associated with the set and at least the first period of time.

7. The method of claim 6 wherein at least one of the sets in the first plurality is in the second complement cover and comprises a plurality of digital certificates which are associated with respective different decryption keys.

8. The method of claim 6 wherein said set of invalid digital certificates is the set of all the digital certificates revoked in a first interval of time preceding the first period of time, said set not including any digital certificate revoked before the first interval of time;
   wherein for at least one digital certificate revoked before the first interval of time, the decryption key associated with the certificate and the first period of time is a function of the decryption key data associated with at least one of the sets containing the certificate and with at least one of said periods of time preceding the first interval of time;
   wherein operation (c) comprises transmitting decryption key data associated with said at least one of the sets containing the digital certificate revoked before the first interval of time and with the first period of time.

9. The method of claim 6 wherein each digital certificate is associated with a computer system which is to receive the decryption key data for the certificate if the certificate is valid, and for at least one set in the second complement cover, the set comprises a plurality of the digital certificates associated with a plurality of the computer systems, but the decryption key data for the set are transmitted to less than all of the computer systems of the plurality for re-transmission to the remaining computer systems of the plurality by one or more, but the less than all, of the computer systems.

10. The method of claim 9 further comprising:
    defining the first complement cover;
    receiving data indicating that the computer systems comprise a first plurality of computer systems, the first plurality being physically close to each other;
    before operation (b), re-defining the first complement cover to increase the number of sets F each of which belongs to the first complement cover and contains the certificates associated with the first plurality of the computer systems.

11. The method of claim 10 wherein the first complement cover is re-defined without changing the total number of sets in the first complement cover.

12. A computer system adapted to perform the method of claim 6.

13. A computer readable medium comprising one or more computer instructions operable to perform the method of claim 6.

14. A computer implemented method for generating, in a first period of time which is one of a plurality of periods of time, a proof of validity or invalidity of a first digital certificate which is one of a plurality of digital certificates, each digital certificate certifying that a cryptographic key is associated with an entity;
    wherein a plurality of sets are defined, each set being a set of one or more of the digital certificates, the plurality of sets comprising a first plurality of sets, wherein the first digital certificate belongs to each set in the first plurality, wherein at least one set of the first plurality comprises two or more digital certificates;
    the method comprising:
    (a) obtaining, for at least the first digital certificate and each said period of time, an encryption of associated proof data for proving validity or invalidity of the first digital certificate in the period of time;
       (a1) wherein for each said certificate and each said period of time, an encryption key and a corresponding decryption key are defined for encrypting and decrypting the proof data associated with the certificate and the period of time;
       (a2) wherein for each said certificate and each said period of time T1, for each said set containing the certificate, decryption key data are defined associated with the set and the period T1, wherein the decryption key associated with the certificate and the period T1 is computable from the decryption key data associated with any given one of the sets containing the certificate and with one or more of the periods of time including the period T1;

(a3) wherein for at least the first period of time, at least two sets of the first plurality of sets are associated with respective different decryption key data, and in at least one set of the first plurality, the first digital certificate and at least one other digital certificate are associated with different decryption keys;

wherein the method further comprises:

(b) receiving, over a network, the decryption key data associated with one of said at least two sets of the first plurality of sets;

(c) using the decryption key data received operation (b) to compute the decryption key associated with the first digital certificate and with the first period of time; and (d) decrypting the proof data for providing a proof of validity or invalidity of the first digital certificate in the first period of time, the decrypting operation being performed under the decryption key obtained in operation (c).

15. The method of claim 14 wherein:

(e) the method further comprises receiving decryption key data associated with one of the sets of the first plurality and with a second period of time preceding the first period of time; and (f) the decryption key computed in operation (c) is obtained from, and depends on, the decryption key data received in operation (b) and the decryption key data received in operation (e).

16. A computer system adapted to perform the method of claim 14.

17. A computer readable medium comprising one or more computer instructions operable to perform the method of claim 14.

18. A computer readable medium comprising first computer data for providing decryption key data associated with sets of digital certificates and with periods of time, each digital certificate certifying that a cryptographic key is associated with an entity, the decryption key data being for providing decryption keys for decrypting encrypted proof data for proving validity or invalidity of the digital certificates in the periods of time, wherein for at least one digital certificate and at least one period of time T1, at least one associated decryption key is computable from the decryption key data associated with any given one of the sets each of which contains the digital certificate and each of which comprises a plurality of digital certificates, and with one or more of the periods of time including said period T1;

wherein for at least one said period of time, at least two of the sets containing said at least one digital certificate are associated with respective different decryption key data, and in at least one of the sets containing said at least one digital certificate, the said at least one digital certificate and at least one other digital certificate are associated with respective different decryption keys.

19. A computer readable medium comprising computer data comprising encrypted proof data for proving validity or invalidity of digital certificates in a plurality of periods of time, each digital certificate certifying that a cryptographic key is associated with an entity, wherein the encrypted proof data are encrypted for decryption with decryption keys, wherein for at least one digital certificate and at least one period of time T1, at least one associated decryption key is computable from decryption key data associated with any given set of a plurality of sets of digital certificates, each set containing said at least one digital certificate and at least one other digital certificate, and with one or more of the periods of time including said period T1;

wherein at least two of the sets are associated with respective different decryption key data, and in at least one of the sets, the said at least one digital certificate and at least one other digital certificate are associated with respective different decryption keys.

20. The method of claim 1 wherein for any period T1 of said periods of time, and for any two sets S1, S2 of said plurality of sets such that S1 is a subset of S2, the decryption key data associated with S1 and T1 are computable from the decryption key data associated with S2 and T1.

21. The method of claim 1 wherein for each said digital certificate and each said period of time, the corresponding decryption key is computable from decryption key data associated with any one of said sets which includes the digital certificate.

22. The method of claim 1 wherein the first plurality of sets comprises a set S1 and a set S2, S1 being a proper subset of S2, wherein for at least one period T1 of said periods of time, the decryption key data associated with S1 and T1 has a bit size equal to a bit size of the decryption key data associated with S2 and T1.

23. The method of claim 6 wherein the first plurality of sets comprises a set S1 and a set S2, S1 being a proper subset of S2, wherein for at least one period T1 of said periods of time, the decryption key data associated with S1 and T1 has a bit size equal to a bit size of the decryption key data associated with S2 and T1.

24. The method of claim 14 wherein for each said period of time, any two different certificates are associated with different proof data.

25. The method of claim 14 wherein all the decryption keys and the decryption key data have the same bit size.

26. A computer implemented method for generating computer data for verifying validity and/or invalidity of digital certificates in a plurality of periods of time, each digital certificate certifying that a cryptographic key is associated with an entity, the method comprising:

(a) obtaining data which define, for each said period of time, associated proof data for proving validity or invalidity of one or more of said certificates in the period of time;

(b) obtaining encryption/decryption data which define, for each said period of time, one or more encryption keys and corresponding one or more decryption keys for encrypting and decrypting the proof data, each decryption key being associated with one of said periods of time for decrypting the proof data in the one of said periods of time;

(b1) wherein for each said period of time, the encryption/decryption data define decryption key data associated with the period of time, the decryption key data being for computing, in the period of time, the decryption keys associated with the period of time;

(b2) wherein for at least one said period of time T1, the decryption keys comprise a decryption key which is associated with the period T1 but which depends on, and is computable from, (i) the decryption key data associated with the period T1 and (ii) the decryption key data associated with one or more of the periods of time preceding T1.

27. The method of claim 26 further comprising obtaining data defining a plurality of sets, each set being a set of one or more of the digital certificates, wherein one or more of said sets each contain two or more of said digital certificates;

wherein for each said period of time, the associated decryption key data comprise separate decryption key data associated with each said set;

wherein for at least said period T1, the decryption key in (b2) is for decrypting proofs associated with one or more of the certificates, and the decryption key in (b2) depends on, and is computable from, (i) the decryption key data associated with the period T1 and with any given one of the sets which contains the one or more of the certificates, and (ii) with the decryption key data associated with the one or more of the periods of time preceding T1 and with respective any one or more of the sets each of which contains the one or more of the certificates.

28. The method of claim 26 wherein said one or more of the periods of time preceding T1 comprise each period of time preceding T1.

29. The method of claim 26 wherein (b2) holds true when T1 is any one of said periods of time other than the earliest period of time.

30. A computer system adapted to perform the method of claim 26.

31. A computer readable medium comprising a computer program operable to perform the method of claim 26.

32. A network transmission method comprising transmitting, by a network, a computer program operable to perform the method of claim 26.

33. A computer implemented method for enabling generation of proofs of validity or invalidity of digital certificates and providing said proofs in periods of time, each digital certificate certifying that a cryptographic key is associated with an entity, the method comprising:
   (a) obtaining first data defining a first complement cover for a set comprising all of said digital certificates;
      (a1) wherein each said certificate and each said period of time are associated with a decryption key for decrypting proof data for proving validity of invalidity of the certificate in the period of time;
      (a2) wherein each said set and each said period of time are associated with decryption key data;
      (a3) wherein for each said certificate and each said period of time T1, the associated decryption key is computable from the decryption key data associated with (i) one or more of the sets containing the certificate and (ii) one or more of said periods of time including the period T1, and if said period T1 is not the earliest period of time, also including a period of time before T1;
   (b) for each said period of time, or for each said period of time other than the earliest period of time:
      (b1) selecting, from the first complement cover, a second complement cover which is a complement cover for a set of invalid digital certificates;
      (b2) for each set of the second complement cover, transmitting decryption key data over a network, the decryption key data being associated with the set and the period of time.

34. The method of claim 33 wherein said set of invalid digital certificates is the set of all the digital certificates revoked in a first interval of time which begins later than the earliest period of time.

35. A computer system adapted to perform the method of claim 33.

36. A computer readable medium comprising a computer program operable to perform the method of claim 33.

37. A network transmission method comprising transmitting, by a network, a computer program operable to perform the method of claim 33.

38. A computer implemented method for enabling generation of proofs of validity or invalidity of digital certificates and providing said proofs in periods of time, each digital certificate certifying that a cryptographic key is associated with an entity, the method comprising:
   (a) obtaining first data defining a first complement cover for a set comprising all of said digital certificates, for selecting from the first complement cover, for each said period of time, zero or more sets of valid digital certificates or zero or more sets of invalid digital certificates, and for providing to computer systems, for each said period of time, data for determining the proofs associated with the period of time;
   (b) receiving data indicating that the computer systems comprise a first plurality of computer systems which are available to receive multicast transmissions;
   (c) re-defining the first complement cover to increase the number of sets each of which belongs to the first complement cover and contains the certificates associated with the first plurality of the computer systems.

39. The method of claim 38 wherein the first complement cover is re-defined without changing the total number of sets in the complement cover.

40. A computer system adapted to perform the method of claim 38.

41. A computer readable medium comprising a computer program operable to perform the method of claim 38.

42. A network transmission method comprising transmitting, by a network, a computer program operable to perform the method of claim 38.

43. A network transmission method comprising transmitting, by a network, a computer program operable to perform the method of claim 1.

44. A network transmission method comprising transmitting, by a network, a computer program operable to perform the method of claim 6.

45. A network transmission method comprising transmitting, by a network, a computer program operable to perform the method of claim 14.

46. A network transmission method comprising transmitting, by a network, first computer data for providing decryption key data associated with sets of digital certificates and with periods of time, each digital certificate certifying that a cryptographic key is associated with an entity, the decryption key data being for providing decryption keys for decrypting encrypted proof data for proving validity or invalidity of the digital certificates in the periods of time, wherein for at least one digital certificate and at least one period of time T1, at least one associated decryption key is computable from the decryption key data associated with any given one of the sets each of which contains the digital certificate and each of which comprises a plurality of digital certificates, and with one or more of the periods of time including said period T1;
   wherein for at least one said period of time, at least two of the sets containing said at least one digital certificate are associated with respective different decryption key data, and in at least one of the sets containing said at least one digital certificate, the said at least one digital certificate and at least one other digital certificate are associated with respective different decryption keys.

47. A network transmission method comprising transmitting, by a network, computer data comprising encrypted proof data for proving validity or invalidity of digital certificates in a plurality of periods of time, each digital certificate certifying that a cryptographic key is associated with an entity, wherein the encrypted proof data are encrypted for decryption with decryption keys, wherein for at least one digital certificate and at least one period of time T1, at least one associated decryption key is computable from decryption key data associated with any given set of a plurality of sets of digital certificates, each set containing said at least one digital certificate and at least one other digital certificate, and with one or more of the periods of time including said period T1;

wherein at least two of the sets are associated with respective different decryption key data, and in at least one of the sets, the said at least one digital certificate and at least one other digital certificate are associated with respective different decryption keys.

* * * * *